(12) United States Patent
Jones et al.

(10) Patent No.: US 8,496,136 B2
(45) Date of Patent: Jul. 30, 2013

(54) APPARATUS FOR DELIVERING A FLUID AND METHODS RELATING THERETO

(75) Inventors: Brian Stewart Jones, Newton-le-Willows (GB); Sergio Malorni, Windsor (GB); Michael Alexander Pratt, Windsor (GB)

(73) Assignee: Colormatrix Holdings, Inc., Wilmington, DE (US)

( * ) Notice: Subject to any disclaimer, the term of this patent is extended or adjusted under 35 U.S.C. 154(b) by 724 days.

(21) Appl. No.: 12/520,650

(22) PCT Filed: Dec. 19, 2007

(86) PCT No.: PCT/GB2007/004876
§ 371 (c)(1),
(2), (4) Date: Dec. 4, 2009

(87) PCT Pub. No.: WO2008/078075
PCT Pub. Date: Jul. 3, 2008

(65) Prior Publication Data
US 2010/0140288 A1    Jun. 10, 2010

(30) Foreign Application Priority Data

Dec. 23, 2006  (GB) .................................. 0625896.6
Oct. 24, 2007  (GB) .................................. 0720868.9

(51) Int. Cl.
*B67D 7/56* (2010.01)
*B65D 37/00* (2006.01)
(52) U.S. Cl.
USPC ............. 222/1; 222/23; 222/181.2; 222/207; 222/214; 222/133; 222/64; 222/325; 222/372

(58) Field of Classification Search
USPC ............. 141/107, 114–116; 222/23, 39, 180, 222/181.1, 181.2, 181.3, 133, 206, 207, 214, 222/325, 372, 64–66, 318; 239/328; 251/149.6; 220/305, 350; 604/65, 67, 122, 257, 260, 604/403, 404, 408, 409, 131–138; 128/DIG. 12, 128/DIG. 13
See application file for complete search history.

(56) References Cited

U.S. PATENT DOCUMENTS

| | | | | |
|---|---|---|---|---|
| 3,142,409 A | * | 7/1964 | Ross | 220/281 |
| 4,068,662 A | * | 1/1978 | Sneider | 604/186 |
| 4,137,940 A | * | 2/1979 | Faisandier | 137/486 |
| 5,135,485 A | * | 8/1992 | Cohen et al. | 604/67 |
| 5,569,188 A | * | 10/1996 | Mackool | 604/67 |
| 5,855,288 A | * | 1/1999 | Dallas, Jr. | 215/228 |
| 5,911,403 A | | 6/1999 | deCler et al. | |
| 6,964,406 B2 | * | 11/2005 | Doyle | 251/149.6 |
| 7,104,422 B2 | * | 9/2006 | DiLeo | 222/64 |

(Continued)

FOREIGN PATENT DOCUMENTS

| | | |
|---|---|---|
| DE | 298 02 493 U1 | 4/1998 |
| EP | 0 392 304 A1 | 3/1990 |

(Continued)

*Primary Examiner* — Kevin P Shaver
*Assistant Examiner* — Patrick M Buechner
(74) *Attorney, Agent, or Firm* — Fay Sharpe LLP

(57) ABSTRACT

Apparatus for delivering a fluid to a location includes a mechanism for supplying fluid connected to a reservoir. The reservoir has a variable volume and includes an outlet via which fluid may be delivered to the location.

25 Claims, 7 Drawing Sheets

U.S. PATENT DOCUMENTS

| | | | |
|---|---|---|---|
| 2003/0024948 A1* | 2/2003 | Last | 222/103 |
| 2003/0196703 A1 | 10/2003 | DeCler et al. | |
| 2004/0164092 A1 | 8/2004 | DiLeo | |
| 2005/0279421 A1 | 12/2005 | O'Dougherty et al. | |
| 2006/0255069 A1* | 11/2006 | Bonner | 222/207 |
| 2012/0138187 A1* | 6/2012 | Jones et al. | 141/2 |

FOREIGN PATENT DOCUMENTS

| | | |
|---|---|---|
| EP | 0 965 423 A2 | 12/1999 |
| JP | 2004360663 A | 12/2004 |
| JP | 2005305396 A | 4/2005 |
| WO | WO 03/035346 A1 | 5/2003 |

* cited by examiner

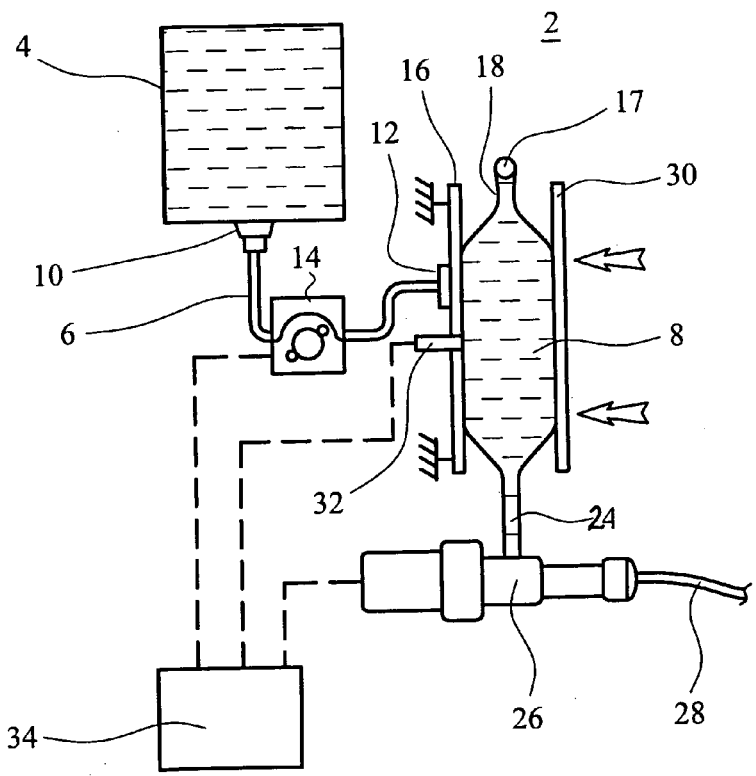
FIG. 1
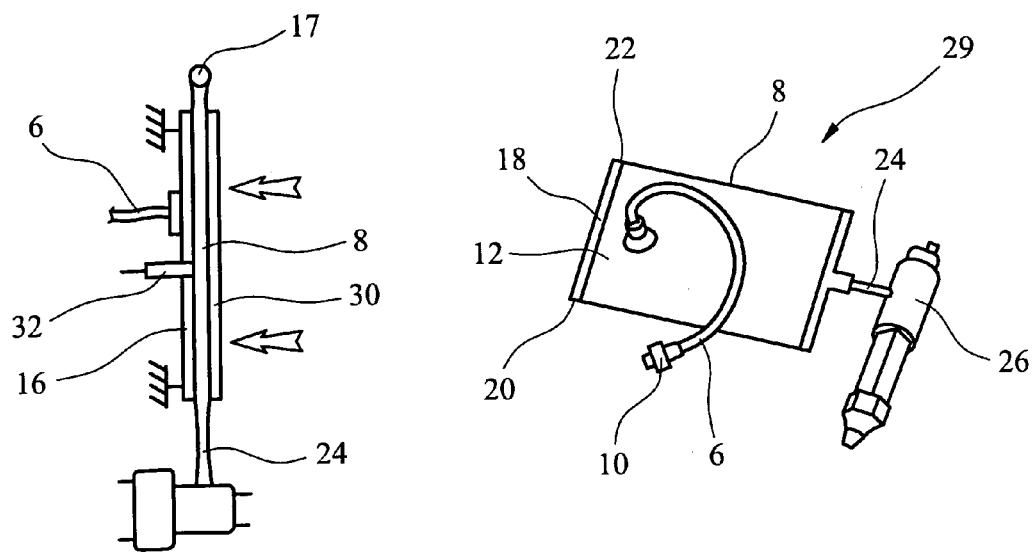
FIG. 2
FIG. 3

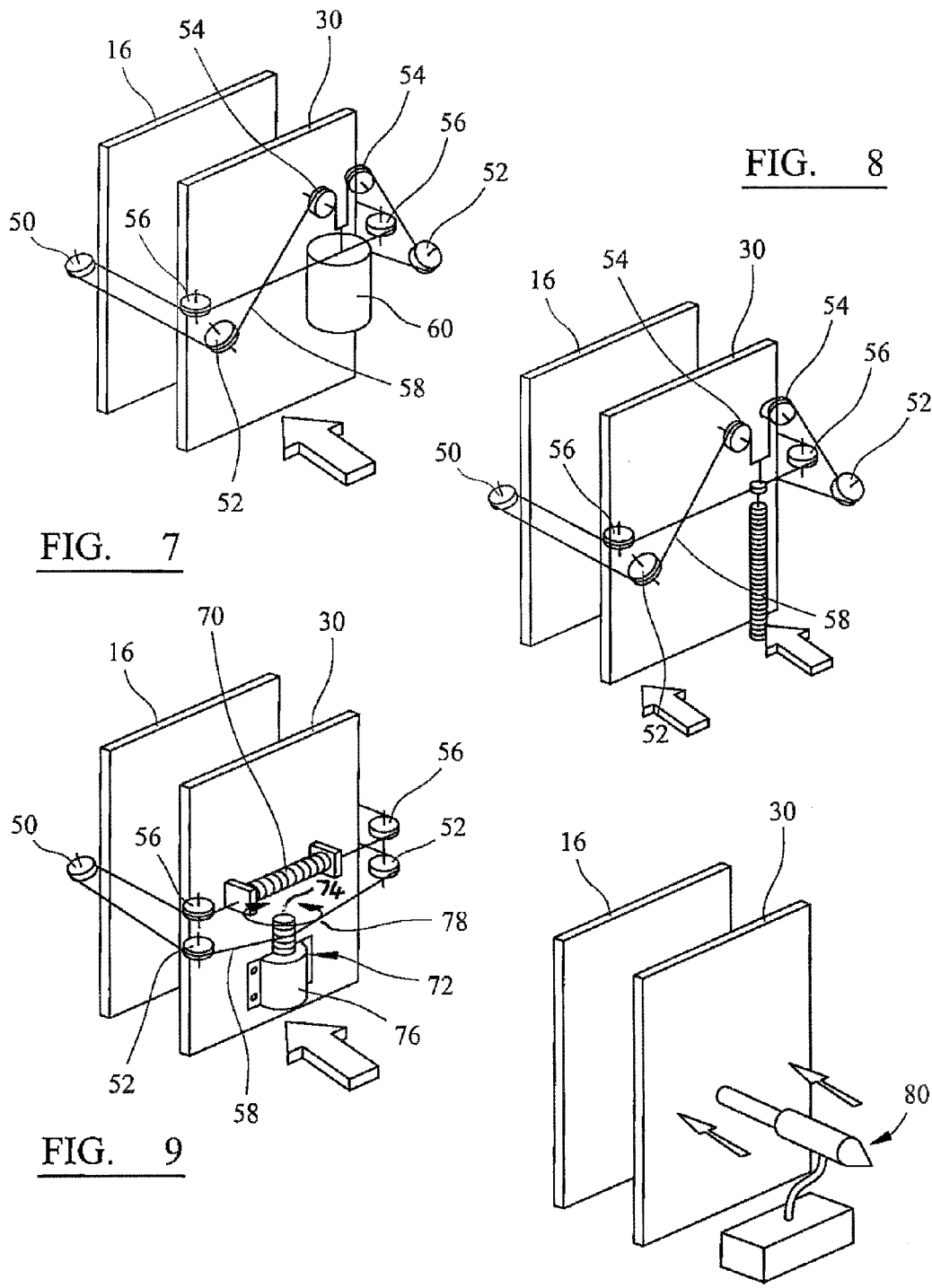

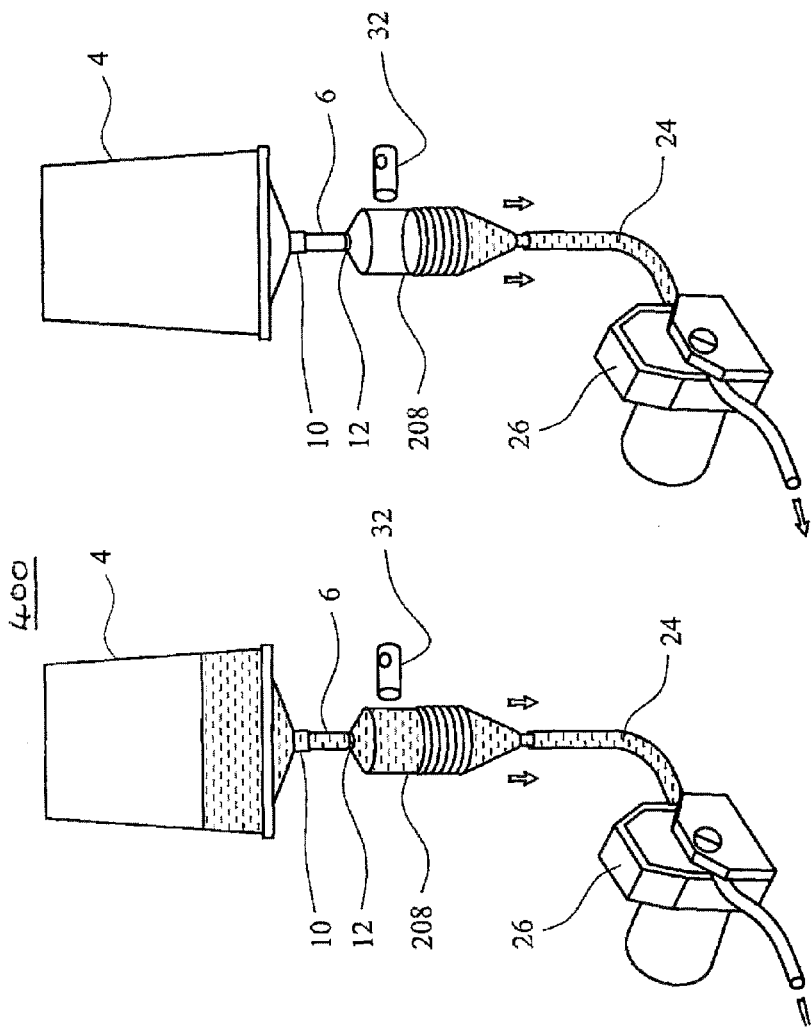
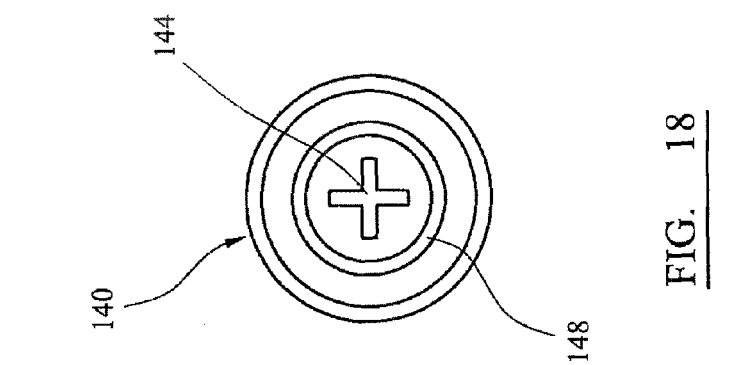

APPARATUS FOR DELIVERING A FLUID AND METHODS RELATING THERETO

This invention relates to apparatus for delivering a fluid and methods relating thereto. Preferred embodiments relate to apparatus for and methods of delivering a fluid and/or liquid colourant into a plastics material.

BACKGROUND

It is known to use liquid colourants to colour plastics material. Typically, this is achieved by accurately dosing liquid colourants into a premixer of plastics forming equipment, such as an injection moulder or an extruder. One example of such a system is described in European patent application No. 99304839.6 (publication no. 0965423) in which a dosing pump draws liquid colourant from vertically displaced collapsible reservoirs and delivers it to a premixer.

Another example of a known system is described in WO03/035346. In this system, liquid colourant material for colouring plastics material prior to a plastics forming process is stored in at least one main reservoir. A dosing pump draws the colourant from the main reservoir and delivers a predetermined amount of colourant. An intermediate reservoir between the main reservoir(s) and the dosing pump inlet temporarily retains colourant material. An evacuation pump in communication with the intermediate reservoir selectively evacuates gas therefrom. The disclosure aims to provide a means of accurate and consistent dosing of colourant material without any entrapped air.

BRIEF DESCRIPTION

It is an object of the present invention to address problems associated with known apparatus for delivering a fluid and methods relating thereto.

According to a first aspect of the invention, there is provided apparatus for delivering a fluid to a location, the apparatus comprising a fluid supply means in fluid communication with a reservoir having a variable volume, wherein the reservoir includes an outlet via which fluid may be delivered to the location.

The reservoir may have a maximum volume of V-max and a minimum volume of V-min. The ratio V-max to V-min may be at least 100, preferably at least 500, more preferably at least 1000. V-max may be at least 0.5 l, preferably at least 1 l. Preferably V-max is in the range 0.5 to 5 l, more preferably 1 to 3 l. V-min may be less than 20 ml, preferably less than 10 ml, more preferably less than 5 ml. V-min may be essentially zero.

Said reservoir may not be self-supporting when it is empty. Preferably, said reservoir is flaccid when empty. Said reservoir is preferably collapsible. Said reservoir may be constructed from a flexible material. Said reservoir suitably includes walls which are not self-supporting. Walls of the reservoir (preferably substantially all walls of the reservoir) preferably have a thickness of less than 1.5 mm, more preferably less than 1 mm. Said reservoir is preferably constructed from a plastics material. Said reservoir is preferably constructed from a flexible sheet material, for example from polyethylene sheet material. Said reservoir may include a first layer comprising a flexible sheet material and superimposed thereon a second layer comprising a flexible sheet material wherein the first and second layers are connected to one another to define a container for containing fluid. Preferably, the reservoir is arranged such that, in its minimum volume condition, the first layer makes face to face contact with the second layer. Preferably, substantially the entirety of said first layer lies flat upon the second layer when in said condition. Preferably, the reservoir is arranged such that in its maximum volume condition, the first and second layers are spaced apart, suitably by a distance of at least 3 cm, preferably at least 4 cm, more preferably at least 5 cm.

The reservoir may have a maximum length, measured in its minimum volume condition, which is greater than its maximum width, measured in its minimum volume condition, suitably wherein the ratio of the aforementioned length to width is at least 1.1, suitably at least 1.3, preferably at least 1.5.

The reservoir may have a substantially quadrilateral shape; it may be square or rectangular; preferably it is substantially rectangular in shape, when in its minimum volume condition.

The apparatus preferably includes suspension means for suspending the reservoir, suitably from its upper end. Said reservoir preferably includes means for cooperating with said suspension means whereby it can be releasably engaged therewith. Said means for cooperating may comprise an opening in the reservoir which is arranged to be engaged by said suspension means. Said opening is preferably elongate. Said opening preferably comprises a sleeve arranged to be slidably engaged, suitably by an elongate suspension means. When said reservoir includes first and second layers as described, the opening is suitably defined between the layers. For example, the layers may be connected together at spaced apart positions with the opening being defined therebetween.

The reservoir preferably includes a fluid inlet and a separate fluid outlet. The outlet is preferably defined in a lower region of the receptacle. The inlet is suitably above the outlet. The outlet may be arranged for passage of fluid out of the reservoir in a first direction and said inlet may be arranged for passage of fluid into the reservoir in a second direction, wherein said second direction is transverse to the first direction and preferably the angle between said first and second directions is at least 45°, preferably at least 75°, especially at least about 90°. Said first direction is preferably substantially horizontal; the second direction may be substantially vertical.

Said fluid outlet preferably communicates with a dosing means, for example a dosing pump, which is arranged to deliver predetermined amounts of fluid to said location. Said apparatus is preferably arranged to deliver fluid from said reservoir to said dosing means at a substantially constant pressure.

Said dosing means may communicate with a dosing pump which is a positive displacement pump, preferably a peristaltic pump.

The apparatus may be arranged to deliver fluids to any location to which it is desired to dose predetermined amounts of fluids. Preferably, however, said apparatus is arranged to deliver fluid into a plastics material so that it can be mixed therewith. Said apparatus may be arranged to deliver fluids, for example colourant, to a premixer stage of plastics forming equipment, for example an injection moulder or extruder.

The apparatus suitably includes a fluid conduit for passage of fluid from the fluid supply means to the reservoir via said fluid inlet. The conduit may be connected to the reservoir by a simple connection means. For example, it may comprise a permanent form of connection (e.g. the conduit may be welded to the reservoir) or it may comprise a screw-threaded connection. Advantageously, the connection means is suitably not a valved connection, for example a dry disconnect means which may help to minimise the cost of the apparatus.

Said fluid conduit may be releasably connected to the fluid supply means. A valve means may be associated with the connection between the conduit and fluid supply means. The apparatus is suitably arranged for disconnection of said fluid supply means and said conduit with substantially no loss of fluid from the fluid supply means or conduit—e.g. no dripping. This may be achieved by withdrawing fluid out of the conduit away from a point of disconnection of the fluid supply means and said conduit and/or by provision of a dry-disconnect valve between the fluid supply means and conduit. These are described further below.

Said fluid supply means may be of any type. It suitably includes a valve member arranged to cooperate with a valve member associated with said fluid conduit, whereby the two valve members suitably define the said valve means associated with the connection between the conduit and fluid supply means. In a preferred embodiment, said fluid supply means incorporates a valve having an opening in which is arranged an operating member for controlling the flow of fluid through the valve; and said fluid conduit incorporates a connector for connection to the valve, wherein said connector comprises sealing means arranged to sealingly engage the valve and actuation means for contacting said operating member of the valve for opening/closing it, wherein the connector is arranged to be releasably connected to the valve so that the sealing means sealingly engages the valve prior to the actuation means co-operating with the operating member to allow the flow of fluid between the valve and the connector. Further details of said connector are described hereinafter in accordance with the fifth aspect.

Said fluid supply means may contain a fluid, for example a liquid colourant, for delivery to said location.

Said fluid supply means may comprise a "bag in a box" supply, for example a POLITAINER (Trade Mark). In a preferred embodiment, said fluid supply means comprises a receptacle having an outlet means, the outlet means including an opening for passage of fluid and a region surrounding the opening, wherein said region is movable from a first storage position to a second operative position in which it tapers towards said outlet (to facilitate dispense of fluid from a receptacle which includes said outlet means). Further details of said preferred embodiment are described hereinafter in said second aspect of the present invention.

Pump means is preferably associated with the fluid conduit which extends between the fluid supply means and reservoir for pumping fluid from the supply means to the reservoir. Said pump means is preferably a positive displacement pump. Preferably, the pump means is arranged not to contact fluid in the fluid conduit. Preferably, in the region of the pump means only the interior of the fluid conduit is arranged to contact fluid therewithin. Preferably no valve means is associated with connection of the pump and fluid conduit. Said pump means preferably comprises a peristaltic pump. Preferably only one such pump is provided between the fluid supply means and reservoir. Said peristaltic pump is preferably a rotary peristaltic pump.

Said reservoir is preferably arranged to be pressurized, suitably so that, in use, fluid delivered therefrom via said outlet is under a substantially constant pressure, suitably so that fluid may be delivered to a dosing means of the apparatus at a substantially constant pressure. The apparatus suitably includes pressurizing means for pressurising the receptacle. Said pressurising means is preferably non-invasive; that is it preferably does not extend through a wall of the reservoir and/or contact fluid therein. Said pressurizing means is preferably arranged to squeeze the reservoir to apply a force to it to squeeze fluid therefrom at substantially constant pressure. Said pressurizing means preferably includes a force applying means which is arranged to apply a force to the reservoir to pressurize it, suitably wherein said force applying member is movable. Said force applying means may be movable between first and second positions. Said force applying means may be movable relative to a cooperating member. Preferably, said reservoir is positioned between the force applying means and cooperating member. Said force applying means is preferably movable relative to the cooperating member to apply a force as described. Said force applying means may be pivotable in which case it may pivot relative to the cooperating member. Preferably, said force applying means is slidable between its first and second positions. Preferably, said force applying means is movable linearly between its first and second positions. Said cooperating member may be movable in which case both it and said force applying means may be movable. Preferably, however, said cooperating member is arranged to be stationary during pressurisation by movement of said force applying means.

Said pressurizing means suitably include a force applying means in the form of a first pressure member, for example pressure plate which is arranged to contact said reservoir (preferably to make face to face contact therewith) to apply a force to squeeze material therefrom. The pressure plate is preferably moveable between first and second positions as described and, more preferably, is slidable and preferably linearly movable for applying said force. Said pressure member is preferably substantially planar, at least in regions of it which contact the reservoir. Said pressurizing means preferably includes a cooperating member which is suitably in the form of a pressure member, for example pressure plate. It suitably provides a reaction force in an opposite direction to that applied by said first pressure member. It is preferably arranged to be substantially stationary when said reservoir is being pressurized. Said cooperating member is preferably substantially planar, at least in a region of it which contacts the reservoir.

Said pressurizing means suitably applies a force to the reservoir in a direction which is transverse (suitably substantially perpendicular to) the direction in which fluid exits the reservoir.

Said pressurizing means is preferably arranged to apply a force, preferably a substantially constant force, across substantially the entirety of a main face of the reservoir.

Said apparatus preferably includes first monitoring means for monitoring the amount of fluid contained in said reservoir. Said monitoring means is preferably non-invasive (i.e. preferably it does not contact fluid in the reservoir or penetrate the wall of the reservoir). Said monitoring means is suitably arranged to monitor the distance between two points or positions which points or positions are related to the amount of fluid contained in the reservoir. Given that the reservoir has a variable volume, the two points or positions are selected such that the distance between varies as the amount of fluid in the reservoir varies. Preferably, said monitoring means includes first and second parts which are in contact with or associated with the reservoir on opposing sides thereof, suitably so that the reservoir is interposed between the first and second parts. The first and second parts are suitably arranged to remain in contact with the reservoir as the volume of fluid in the reservoir varies and, accordingly, the distance between the first and second parts will provide an indication of the amount of fluid contained within the reservoir at any time.

At least one of, preferably both of, said first and second parts is/are preferably associated with said force applying means (when provided). In a preferred embodiment, said first part is associated with, for example is a part of, said first pressure member of said force applying means which is movable. Said second part may be part of the cooperating member.

In a preferred embodiment, the force applying means includes a pressure plate and cooperating member with the reservoir being positioned therebetween and the first monitoring means is arranged to monitor the distance between parts of the pressure plate and cooperating member for providing information on the amount of fluid in the reservoir.

The apparatus preferably includes second monitoring means for monitoring the contents of the reservoir. Said second monitoring means is preferably non-invasive—(i.e. preferably it does not contact fluid in the reservoir or penetrate the wall of the reservoir). Said second monitoring means is preferably arranged to monitor the reservoir to give an indication of whether the reservoir contains a gas, for example air and/or whether the amount of gas in the reservoir is above a predetermined level. Said second monitoring means is preferably arranged to be able to distinguish between gas and said fluid which is to be delivered to said location without contacting fluid in the receptacle. For example, said second monitoring means may distinguish by a physical measurement of fluid in the receptacle taken from a position outside the receptacle. Such a physical measurement may comprise an optical or electrical measurement. Preferably, it comprises an electrical measurement. For example, capacitance may be measured across the receptacle. When said apparatus include a pressure member, for example pressure plate, and cooperating member, at least one part of said second monitoring means, for example a capacitance sensor, may be associated with either said pressure member or cooperating member.

Said second monitoring means preferably monitors the reservoir at a position between an inlet and outlet of the reservoir, preferably at a position closer to the inlet than said outlet.

Said second monitoring means preferably monitors said reservoir at a position wherein air may accumulate when said reservoir is pressurized, for example by said pressurizing means described.

Said apparatus preferably includes a control/monitoring means. Said control/monitoring means may monitor the volume of the reservoir, for example by controlling operation of and/or monitoring information received from the first monitoring means when provided. When the apparatus includes a pump means associated with a fluid conduit which extends between the fluid supply means and the reservoir, said control/monitoring means may control operation of the pump means. Preferably, said control/monitoring means is arranged to be able to cause the pump means to pump fluid in opposite directions in said fluid conduit according to circumstances. When the apparatus includes a dosing means, said control/monitoring means may communicate with and/or control the dosing means. When the apparatus includes second monitoring means, said control/monitoring means may control operation of and/or monitor information received from the second monitoring means. Said control/monitoring means may be arranged to operate a signal means for signalling to an operator when the fluid supply means needs to be replaced.

The reservoir may have a generally cylindrical shape when empty. The reservoir may be constructed from a resilient material. Preferably, the material is plastic. The reservoir may comprise an expandable portion. The reservoir may have walls formed to concertina. The expandable portion may have walls arranged to concertina. Preferably, the reservoir comprises at least one portion having substantially rigid walls. The expandable portion may be arranged between rigid portions of the reservoir. The expandable portion may form a mid-portion of the reservoir. The reservoir may have a length greater than its diameter in an expanded state. The reservoir may be arranged to be suspended by a rigid portion. Preferably, the reservoir is suspended from an upper region.

The reservoir may be arranged to self-tension. The reservoir may be naturally biased to expand. Preferably, a suspended weight of the reservoir causes expansion of the reservoir. The apparatus may comprise tensioning means arranged to tension the reservoir. The tensioning means may apply tension lengthwise to the reservoir. The tensioning means may comprise a spring arranged to exert a downward force upon a lower region of the reservoir.

The apparatus may comprise means for collapsing the reservoir. The collapsing means may reduce a volume of the reservoir. The collapsing means may be manually operated, or may be electrically, pneumatically or hydraulically operated. The collapsing means may be a lever arranged to act against the reservoir. Preferably, the collapsing means is arranged to raise a lower region of the reservoir.

Preferably, the reservoir is arranged below a fluid supply means. Preferably, the reservoir is arranged underneath the fluid supply means. Preferably, the reservoir is arranged to self-fill from the fluid supply means. The self-filling may be due to one or both of gravity and/or suction from self-expansion of the reservoir. Preferably, there is no mechanical pumping means arranged between the fluid supply means and the reservoir.

The reservoir preferably comprises a fluid outlet. The fluid outlet may be a pipe. Preferably the pipe comprises a pump means. Alternatively, a pump means may be provided to act upon the pipe. The pump means may act upon the pipe by peristaltic action.

According to a second aspect of the invention, there is provided an outlet means of or for a receptacle, the outlet means including an opening for passage of fluid and a region surrounding the opening (herein referred to as "the surrounding region"), wherein said surrounding region is movable from a first storage position to a second operative position in which it tapers towards said outlet suitably so as to facilitate dispense of fluid from a receptacle which includes said outlet means.

Said outlet means may comprise a lid which is arranged to be releasably engaged with a receptacle or may be a part of a receptacle. Advantageously, the outlet means is preferably arranged to be releasably engaged with a receptacle. In this case, the receptacle may be of a standard design and may comprise a cheap "off-the-shelf" receptacle.

Said outlet means is preferably arranged such that, when in the first storage position and associated with a receptacle to act as a closure means thereof, said surrounding region does not project outwardly from a plane which contains the outer perimeter of the outlet means. Where said outlet means comprises a lid of or for a receptacle, said plane may be defined by an endless region at or towards the periphery of the lid.

Said surrounding region and associated opening are preferably movable in a direction which is suitably substantially parallel to the direction in which fluid may exit the opening in use.

When in said second operative position, said surrounding region is suitably arranged to be, at least partially, on one side of a plane of said outlet means; and when in said storage position it is suitably arranged to be, at least partially, on an opposite side of said plane.

When in said operative position, said surrounding region preferably includes a convex outwardly facing surface. Said surrounding region may include a conical, or part conical, for example frusto-conical outwardly facing surface.

Said outlet is preferably positioned substantially centrally within said surrounding region. When said surrounding region includes a conical or part conical surface, said opening may be coincident with the axis of the cone.

When in said storage position, said surrounding region may include a concave outwardly facing surface. Said surrounding region may include a conical or part conical, for example frusto-conical, inwardly facing surface.

Said surrounding region may be hingedly mounted by hinge means for movement between its first and second positions. Said hinge means may comprise a first region, for example a first weakened region, of the outlet means around the periphery of the surrounding region. Said first region is preferably substantially circular. Said hinge means may comprise a second region, for example a second weakened region at or adjacent, preferably around, the opening in the surrounding region. Said second region is preferably substantially circular. Said first and second regions may define substantially concentric circles which are preferably centred upon said opening for passage of fluid.

Said first region is preferably defined in an area of said surrounding region made from a plastics material. Said second region is preferably defined in an area of said surrounding region made from a plastics material.

Said outlet means preferably includes operation means for causing the surrounding region to move from its first to its second position and suitably back from its second to its first position. Said operation means may comprise a projecting member arranged to be grasped by an operator when the surrounding region is in its first storage position to urge it to its operative position.

Said outlet means preferably incorporates an air bleed opening for allowing air to flow into the receptacle during flow of fluid from the receptacle via said opening for passage of fluid. Said air bleed opening may comprise a one-way valve arranged to allow air to flow into the receptacle and to substantially prevent flow of fluid out of the receptacle via said one-way valve.

Said surrounding region of said outlet means preferably comprises a plastics material and is preferably made substantially entirely from a plastics material. Said outlet means is preferably made substantially entirely from a plastics material.

The opening in said outlet means may comprise a separate component which is engaged, for example releasably engaged, with the region surrounding the opening. For example, it may be engaged in an opening in said region surrounding the opening. Said separate component may include a valve member as described above for said fluid supply means.

Advantageously, receptacles comprising outlet means of the second aspect are stackable as a result of the outlet means being positionable in its storage position. Nevertheless, advantageously, the outlet means can when required be positioned in its operative position wherein it tapers as described. In this case, the receptacle can be positioned with its outlet facing downwardly and the arrangement is such that the tapering of the surrounding region towards the outlet facilitates emptying of the receptacle. Thus, the receptacle can be stored as easily as a POLITAINER (Trade Mark) but may be emptied more efficiently due to its tapered outlet.

The invention extends to a method of manufacturing an outlet means according to the second aspect, the method comprising defining, for example in a plastics moulding process, an outlet means which includes an opening for passage of fluid and a region surrounding the opening and engaging a separate component in said opening, wherein said separate component is suitably a valve member.

According to a third aspect of the invention, there is provided an assembly comprising a plurality of receptacles each having a respective outlet means of the second aspect closing the receptacles, wherein a first one of said receptacles is stacked upon a second one of said receptacles; and suitably said surrounding region of said outlet means of said second receptacle is in its first storage position.

Preferably, said first receptacle includes a base which is stacked upon an outlet means of the second receptacle. At least three of said receptacles may be provided in a stack.

According to a fourth aspect of the invention, there is provided a method of preparing a receptacle which includes an outlet means according to the second aspect or is part of an assembly according to the third aspect for use in an apparatus for delivering a fluid to a location, for example an apparatus according to the first aspect, the method comprising:

(i) selecting a receptacle which includes a fluid, for example a colourant, for delivery to a location, wherein said receptacle includes an outlet means which closes the receptacle and includes a said surrounding region in its first storage position;

(ii) causing the surrounding region to move from its storage position to its operative position;

(iii) positioning said receptacle with its outlet facing downwardly;

wherein step (ii) may precede step (iii) or vice versa.

According to a fifth aspect of the invention, there is provided a connector for connection to a valve having an opening in which is arranged an operating member for controlling the flow of fluid through the valve, the connector comprising sealing means arranged to sealingly engage the valve and actuation means for contacting an operating member of the valve for opening/closing it, wherein the connector is arranged to be releasably connected to the valve so that the sealing means sealingly engages the valve prior to the actuation means co-operating with the operating member to allow the flow of fluid between the valve and the connector.

According to a sixth aspect of the invention, there is provided a method of delivering a fluid to a location, the method comprising:

(i) delivering fluid from a fluid supply means reservoir which has a variable volume; and (ii) delivering fluid from the reservoir to the location.

The method may use apparatus as described in any statement herein.

The method of delivering fluid to the reservoir preferably uses a pump means which does not contact fluid being delivered. The method preferably uses a single pump for delivering fluid to the reservoir.

The method preferably comprises pressurising the reservoir suitably by squeezing the reservoir. During the delivery of fluid from the reservoir, the shape of the reservoir may change. Preferably, a substantially constant force is applied to the reservoir during delivery of fluid to the location. Preferably, the method comprises maintaining the pressure of fluid output from the reservoir substantially constant. The method preferably comprises monitoring the amount of fluid contained in said reservoir and outputting a signal, for example to an operator if the amount falls below a predetermined amount. Preferably, the signal is outputted at a time which is such as to give an operator sufficient time to replace the fluid supply means before the reservoir is empty thereby to allow fluid to be delivered to the location uninterrupted during replacement of the fluid supply means.

The method preferably comprises monitoring the contents of the reservoir. This may be undertaken using second monitoring means described above. The method may comprise monitoring the reservoir to establish if it contains gas, for example air. If the level of gas is above a predetermined level, the method may comprise withdrawal of fluid (including gas) from the reservoir and suitably the return of such fluid to the fluid supply means. Suitably, removal is via an inlet to said reservoir and is preferably via the same fluid conduit which is used to deliver fluid from the fluid supply means to said reservoir. Preferably, said fluid conduit is arranged to communicate with said reservoir at a position at which gas may accumulate if gas is contained in the reservoir. Given that gas is likely to rise up towards the top of the reservoir, said fluid conduit suitably communicates with a region of the reservoir towards the top thereof.

After fluid has been withdrawn from the reservoir and returned to the fluid supply means, the method may comprise again delivering fluid from the fluid supply means to the reservoir. If after return of fluid to the fluid supply means, the level of gas in the reservoir is still above said predetermined level a signal is output suitably to an operator. In response, the operator may replace the fluid supply means because the diagnosis may be that gas (air) is being pumped from the fluid supply means to the reservoir because the fluid supply means is almost empty. Sufficient time for replacing it is suitably provided as described above for replacement initiated by the fluid level falling below a predetermined amount.

The method may comprise, prior to disconnection of a fluid flow path between the fluid supply means and reservoir, withdrawing fluid away from a point of disconnection (e.g. a valve means) suitably in a direction towards the reservoir thereby to reduce the risk of drops from the point of disconnection.

The method may comprise allowing the reservoir to fill from the fluid supply means. Preferably, the reservoir is allowed to fill under the influence of gravity.

The method may comprise applying tension to the reservoir. Preferably, a downward force is applied to the reservoir. The downward force may be applied to a lower region of the reservoir. Preferably, the reservoir is allowed to fill without directly pumping fluid from the fluid supply means to the reservoir.

Preferably, the method comprises disconnecting the reservoir from the fluid supply means whilst fluid is being drained or output from the reservoir. Preferably, the fluid supply means is replaced whilst the reservoir is in use. Following replacement of the fluid supply means, or disconnection of the fluid supply means, the reservoir is evacuated of air. The reservoir may be evacuated of air by applying a compressive force to the reservoir. Preferably, the reservoir is caused to collapse to a minimum volume. Preferably, gas contained in the reservoir is forced outward toward the fluid supply means.

According to a seventh aspect of the invention, there is provided a method of assembling apparatus according to the first aspect, the method comprising selecting a reservoir, selecting a fluid supply means, and establishing fluid communication between the two.

The method may comprise selecting a delivery pack which comprises a reservoir and a fluid conduit, for example a pipe. The conduit is preferably connected to the reservoir by a connection which does not comprise a valve and/or by a connection which is always in an open position wherein fluid can flow along the conduit into the reservoir.

The delivery pack may then be connected to the fluid supply means and a valve means is then suitably arranged between the fluid supply means and reservoir. The fluid supply means may carry a valve part which may cooperate with another part provided at an end of the fluid conduit of the delivery pack.

In an eighth aspect, the invention extends to a delivery pack for use with an apparatus described and/or in a method described. The delivery pack may contain, in its reservoir, a fluid to be delivered to the location.

According to a ninth aspect of the invention, there is provided a method of disassembling apparatus according to the first aspect, the method comprising withdrawing fluid from a disconnection point which is arranged between the fluid supply means and reservoir, suitably in a direction towards and/or into the reservoir and then disconnecting the fluid supply means from the reservoir at said disconnection point.

The method may be used when it is desired to replace a said fluid supply means.

The invention extends in a tenth aspect to a method of testing a sample of fluid for delivery to a location, for example for testing a colour for use in a polymer, the method comprising:

(i) selecting a delivery pack as described which includes a sample of fluid;

(ii) assembling the delivery pack with apparatus of the first aspect;

(iii) using the apparatus to deliver the fluid to the location.

The method may include a further step of disassembling the delivery pack from the apparatus and assembling a different delivery pack containing a different sample.

The invention extends to a system for delivering selected fluids to locations, for example selected colours to locations, the systems comprising:

(i) a plurality of fluid supply means;

(ii) a plurality of delivery packs of the type described, wherein said plurality contains different fluids;

(iii) apparatus according to the first aspect.

The items referred in (i) and (ii) may be stored prior to (and suitably subsequent to) use in the apparatus of the first aspect. Advantageously the apparatus is such that its fluid supply means can be changed quickly as described herein without the need for significant clean down of components of the apparatus.

Any feature of any aspect of any invention or embodiment described herein may be combined with any feature of any aspect of any other invention or embodiment described herein mutatis mutandis.

BRIEF DESCRIPTION OF THE DRAWINGS

Specific embodiments of the invention will now be described, by way of example, with reference to the accompanying drawings in which:

FIG. 1 is a schematic representation of a first embodiment of dosing apparatus, with a substantially full intermediate reservoir;

FIG. 2 is a view of part of the apparatus of FIG. 1 with a substantially empty intermediate reservoir;

FIG. 3 shows a first embodiment of colour change assembly removed from the apparatus;

FIGS. 7 to 10 show various different pressure plate assemblies for applying a substantially constant pressure to the intermediate reservoir in the first embodiment;

FIG. 18 is a cross-section along line XVIII of FIG. 16;

FIG. 19 is a schematic view of a second embodiment of dosing apparatus with a substantially full main and full intermediate reservoir;

FIG. 20 is a view of the apparatus of FIG. 19 with an empty main reservoir and a substantially empty intermediate reservoir;

In the figures, the same or similar parts are annotated with the same reference numerals.

DETAILED DESCRIPTION

Figure 4:
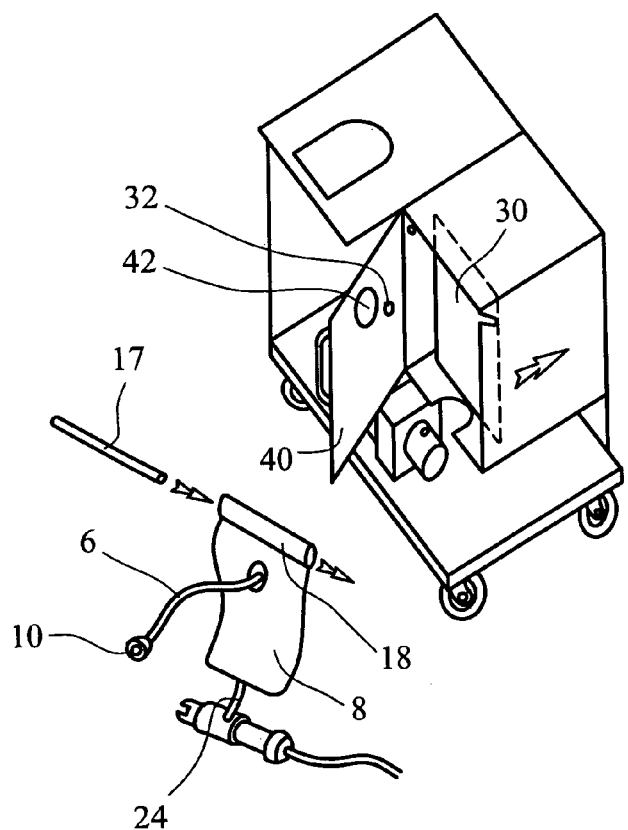
FIG. 4 is a perspective, partly exploded, view of a trolley carrying the first embodiment of dosing apparatus with a hinged panel of the apparatus in an open position.

Referring to FIG. 1, the first embodiment of dosing apparatus 2 includes a main additive reservoir 4 which is connected via pipe 6 to an intermediate reservoir 8. The pipe 6 is connected to the reservoir 4 by a dry disconnect valve 10 and is connected to pipe 6 via a simple screw-threaded coupling 12. A peristaltic pump 14 cooperates with pipe 6 for pumping fluid from the reservoir 4 to the reservoir 8.

Coupling 12 extends through an opening (not shown) in a stationary plate 16 so that it is in fluid communicate with reservoir 8. The plate 16 is fixed to structural parts (not shown) of the apparatus.

The reservoir 8 comprises a plastics bag which incorporates an opening (not shown) towards an upper end for communicate with pipe 6. At its upper end the bag includes an elongate sleeve 18 (FIG. 3) which is open at its ends 20, 22 for receiving a horizontally extending elongate support bar 17 which can be slid into the sleeve and thereby arranged to support the reservoir 8 adjacent to plate 16. At its lower end, the reservoir 8 includes an outlet tube 24 which is arranged to deliver fluid to a dosing pump 26. The assembly shown in FIG. 3 of connectors 10, 12, pipe 6, reservoir 8, tube 24 and pump 26 is referred to herein as a colour change assembly 29.

The dosing pump 26 is arranged to deliver a predetermined quantity of fluid into a process via pipe 28.

Opposite stationary plate 16 is a pressure plate 30 which is movable and is arranged to apply a constant pressure to bag 8 which is positioned between plates 16 and 30.

Plate 16 incorporates a capacitance air sensor 32 which is arranged to monitor the contents of the reservoir 8 at a predetermined position therein to determine if it contains additive and/or or air. The sensor 32 suitably has a field of view which extends about 10-15 mm and therefore extends across part of reservoir 8.

The apparatus 2 includes a central processing unit (cpu) 34 which is connected to and controls and/or receives data from, pump 14, sensor 32 and pump 26.

The apparatus 2 may be assembled and operated as follows: A colour change assembly 29 comprising an empty, flat reservoir 8 is selected and suspended between spaced apart plates 16, 30 by engaging elongate support bar 17 within elongate sleeve 18 and thereafter the reservoir 8 is sandwiched between the plates 16, 30 as seen in FIG. 2.

Reservoir 4 is full of additive which it is desired to deliver into a process. It is supported in position by means not shown and then pipe 6 is connected to its outlet via valve 10. The pipe 6 is then operatively connected to the peristaltic pump 14.

Next, the pump 14 is operated, under the control of the cpu 34, to charge intermediate reservoir 8 with additive which flows from reservoir 4 via pipe 6 and into the reservoir 8. The reservoir 8 expands against the pressure exerted by plates 16, 30 from the arrangement shown in FIG. 2 to the arrangement shown in FIG. 1, wherein it is substantially full of fluid. The cpu can then control pump 26 for delivering additive from reservoir 8 via pipe 28 and into a process.

Due to the substantially constant pressure applied by pressure plate 30 to reservoir 8, fluid is fed to pump 26 at a substantially constant pressure (irrespective of the amount of fluid contained within the reservoir 8) and this greatly facilitates accurate dosing of fluid into a downstream process using pump 26.

As fluid is fed to pump 26, the amount of fluid in reservoir 8 falls and plate 30 moves towards plate 16. When plate 30 is at a predetermined distance from plate 16, the cpu 34 causes pump 14 to operate to replenish reservoir 8 to its "full" level.

The capacitance air sensor 32 (FIG. 1) continuously monitors the capacitance of the contents of reservoir 8 to determine if the region opposite the sensor includes additive or air. Air may enter reservoir 8 by virtue of there being an air pocket in reservoir 4; air being sucked into pipe 6 via a leaking connector; or simply due to the reservoir 4 being almost empty. The air will tend to rise to the top of reservoir 8. It will be appreciated that if any air present in reservoir 8 is allowed to pass into pump 26 then this could significantly affect the accuracy of dosing of additive into a process via pipe 28. Thus, if air is sensed by sensor 32 then steps are taken to remove the air from reservoir 8. In this regard, when air is sensed in reservoir 8, pump 14 is reversed to withdraw fluid from reservoir 8 and return it to reservoir 4. Since pipe 6 is connected to reservoir 8 towards its upper end, the fluid withdrawn will include contained air which will have risen to the top of reservoir 8. Fluid is withdrawn by pump 14 until the sensor 32 senses that air is no longer present in the reservoir 8.

After fluid (including air) has been returned to reservoir 4, the pump 14 is reversed to again pump fluid from reservoir 4 to reservoir 8. The sensor 32 continues to monitor whether reservoir 8 contains air. In one case, it may be that at this stage, the sensor does not sense the presence of any air in reservoir 8 (in which case it may be concluded that there was an air lock (or the like) in reservoir 4 which had been pumped into the reservoir 8). On the other hand, if the sensor 32 still senses the presence of air then the cpu 34 may cause fluid to again return fluid to reservoir 4 and subsequently to pump fluid from reservoir 4 to reservoir 8. If at this stage, the sensor still senses the presence of air then the cpu 34 will issue an instruction to an operator to change reservoir 4 which must be approaching emptiness because air rather than additive is passing from it to reservoir 8.

During transfer of fluid from reservoir 8 to reservoir 4 (and vice versa) fluid is continuously fed from reservoir 8 to pump 26 at a constant head pressure. Thus, additive can continuously be delivered by pump 26 via pipe 28 into a process.

In due course, reservoir 4 will inevitably approach emptiness. This will be apparent when plate 30 is at the predetermined distance described from plate 16 but operation of pump 14 does not cause replenishment of reservoir 8. In this case an operator will be instructed by an alarm to replace reservoir 4. The apparatus is arranged so that a reservoir 4 can be replaced without interrupting the supply (or pressure of supply) of fluid to pump 26. Initially, when the alarm is raised, the reservoir 8 may be about half full. Because the pressure plate 30 is under a constant force, the pressure of fluid delivered to pump 26 will remain constant. The volume of fluid within reservoir 8 when the alarm is raised and the rate of delivery of fluid by pump 26 are such that there is a predetermined time for changing reservoir 4 and operating pump 14 to refill reservoir 8 to its FIG. 1 state. Provided reservoir 4 is changed within the predetermined time then continuous delivery of fluid to pump 26 is ensured.

Furthermore, the apparatus is arranged to allow reservoir 4 to be changed with substantially no spillage. In this regard valve 10 is of a dry disconnect or quick disconnect design. To further reduce the risk of spillage, the cpu causes the pump 14 to pump fluid away from valve 10 (i.e. towards reservoir 8) prior to disconnection of pipe 6 from reservoir 4. By containing all fluid in pipe 6 on the reservoir 8 side of pump 14, there is a reduced tendency for detached valve 10/pipe 6 to leak fluid.

After a period of time, an operator may desire to stop using the apparatus to deliver one material, for example one colour, and use it to deliver another material, for example another colour. In this case, the pipe 6 may be disconnected from reservoir 4 and pipe 28 can be disconnected from any process it was delivering fluid into. The reservoir 4 and the colour change assembly 29 can then be stored for future use. In one embodiment, pump 26 may be a peristaltic pump in which case the colour change assembly may include a peristaltic tube 24 but no pump 26 since pump 26 may remain a substantially permanent part of apparatus 2. It should be appreciated that the components of the colour change assembly (particularly pipe 6, valve 10 and bag 8) are relatively cheap and/or disposable so it is not costly to store them, rather than have to clean them and/or re-use them each time a different colour (or other material) is to be delivered using the apparatus 2. Advantageously, therefore, material (e.g. expensive colour) is not wasted between runs of the apparatus using different materials/colours and, furthermore, the time to change from one material/colour to another is very short.

In some situations, users of apparatus 2 may desire to test a sample of colour or other material prior to purchasing bulk quantities of materials in reservoirs 4. In this case, manufacturer may supply a colour change assembly having a reservoir 8 which is full or partially full of a material to be tested. The colour change assembly can be introduced into the apparatus 2 and material delivered from its reservoir 8 for testing. If the material tested is acceptable, then reservoirs 4 of material can be supplied and used with the colour change assembly previously supplied. Advantageously, by supplying samples in the form of colour change assemblies as described, purchasers can relatively quickly test materials without significant downtime or cleaning of apparatus 2.

Figure 5:
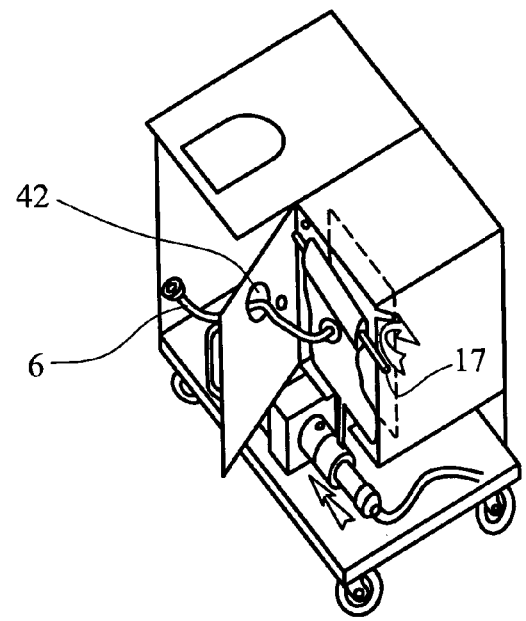
FIG. 5 is a perspective view of the trolley shown in FIG. 4 with an intermediate reservoir fitted in position.
Figure 6:
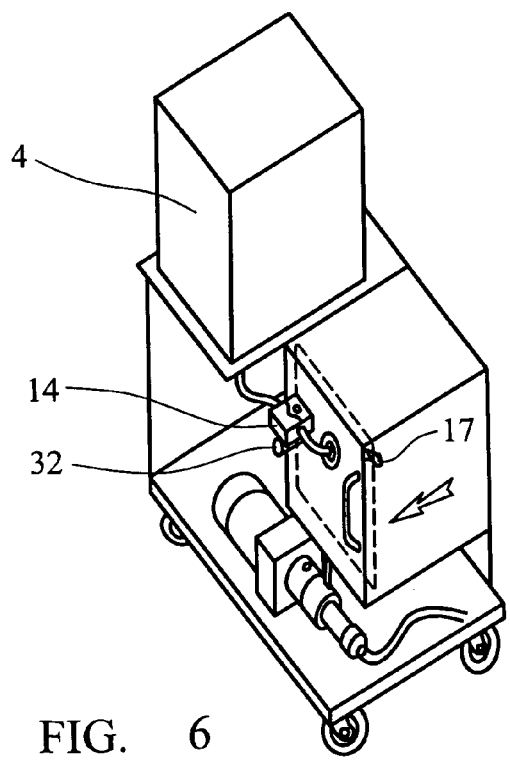
FIG. 6 is a perspective view of the trolley shown in Figure with a main reservoir in position.

The apparatus 2 may be incorporated into a trolley which can be moved to a location wherein it is desired to deliver a material, for example colour, as shown in FIGS. 4 to 6. Referring to the figures, the apparatus includes a hinged panel 40 which, when in a closed position, defines the stationary plate 16 and faces pressure plate 30. An elongate support bar 17 is associated with panel 40 and is arranged to be engaged within sleeve 18 of reservoir 8. When the reservoir 8 is assembled on the bar 17, pipe 6 is extended through opening 42 and engaged with a valve part (not shown) defined in the underside of reservoir 4 and tube 24 can be extended through an opening and connected to a pump 26.

FIGS. 7 to 11 show various means by which the pressure plate 30 can be urged, under a substantially constant force, towards the stationary plate 16. In each case, the pressure plate 30 is mounted by means (not shown) whereby it is guided, for example arranged to slide, along a linear travel path towards and away from plate 16.

Referring to FIG. 7, a pulley and weight system is used to resiliently bias plate 30 towards plate 16. The system includes pulley wheels 50, 52 and 54 which are translationally fixed to an immovable structure (not shown). It will be appreciated that two wheels 50 are provided opposite one another although only one is visible in FIG. 6. Pulley wheels 56 are translationally fixed to pressure plate 30. A wire 58 extends around the pulley wheels and is connected to a weight 60. As weight 60 falls under gravity, plate 30 is caused to move towards plate 16 under a substantially constant force.

The FIG. 8 arrangement is similar to that of FIG. 7 except that a spring (e.g. a compression, tension or gas spring) 62 is arranged to apply a force to cause plate 30 to move towards plate 16.

The FIG. 9 embodiment has similarities to that of FIG. 6 except that pulley wheels 54 have been omitted and replaced with a compression spring 70 and the weight has been replaced with a motorized spool device 72. The device 72 includes a spool 74 around which wire 58 extends so that as the spool is rotated by motor 76 in the direction of arrow 78 the effective length of wire 58 is shortened and plate 30 is thereby urged towards plate 16.

The FIG. 10 embodiment includes a pneumatic ram 80 which is fixed to plate 30 and arranged to urge it towards plate 16.

When an empty reservoir 8 is engaged with the apparatus 2 for example in the trolley form of FIG. 4, this can be achieved easily by opening panel 40, engaging reservoir with bar 17 and then closing panel 40. However, when a full or partially full reservoir 4 is to be engaged with apparatus 2 (e.g. when a colour is to be tested or when a previously used colour change assembly is to be reused), the plate 30 of the apparatus must be retracted away from plate 16 so that there is sufficient space to accommodate the reservoir 8. Means (not shown) is provided whereby plate 30 can be retracted.

Referring to FIGS. 19-22, the second embodiment of dosing apparatus is shown. Parts having the same construction and function as in the first embodiment are identified with like reference numerals.

The second embodiment of dosing apparatus 400 includes a main additive reservoir 4 which is connected via a pipe 6 to an intermediate reservoir 208. The connection of intermediate reservoir 208 to additive reservoir 4 via pipe 6 is as in the first embodiment incorporating a dry disconnect valve 10 and suitable coupling means such as a screw-threaded coupling 12 attaching to the intermediate reservoir 208. However, unlike in the first embodiment, there is no pump 14 arranged between the main reservoir 4 and intermediate reservoir 208.

The reservoir 208 comprises three sections arranged in vertical orientation. Generally rigid upper and lower sections of the reservoir 208 are interposed by a collapsible mid-section. The mid-section has a plurality of folds such that the mid-section is formed by a plurality of alternating inwardly and outwardly extending leaves. Thus, the mid-section of the reservoir concertinas between a collapsed configuration and an extended configuration with the application of tension to the mid-section. In the extended configuration the plurality of folds have a large angle intersection angle between each pair, whilst in the collapsed configuration each pair of leaves lie generally co-extensive to one-another with a very small angle of intersection.

In a relaxed state, the reservoir 208 rests in an intermediate configuration and has an intermediate volume. With the application of tension to the mid-section, such as by the application of opposed forces to the upper and lower sections, the reservoir 208 moves toward and eventually adopts the extended configuration having a maximum volume. Likewise, the application of a composite force causes the reservoir 208 to adopt the collapsed configuration. The reservoir 208 is made from a suitably resilient plastics material to be naturally biased in the intermediate configuration.

The reservoir 208 is arranged in the apparatus 400 to be suspended in a generally vertical orientation such that the reservoir naturally tends toward the extended configuration by gravity acting upon the reservoir 208.

At a lower end, the reservoir 208 includes an outlet tube 24 which is arranged to deliver fluid to a dosing pump 26. The dosing pump may be a peristaltic pump which acts on the outlet pipe 24 to draw fluid from the reservoir 208 and deliver a predetermined quantity of fluid to a process via the pipe 24.

In use, a tensioning force is applied to the reservoir 208 to draw fluid from the main reservoir 4. It is desirable for the tensioning force to be as small as possible to reduce a resultant range of pressures applied to the fluid contents of the reservoir 208. If a large pressure range is applied to the fluid in the reservoir 208, then this creates a variation in the inlet pressure of pump 26 which may be detrimental to the dosing accuracy of the apparatus 400. Therefore, ideally the reservoir 208 is self-tensioning under its own weight or a small tensioning force is applied to the reservoir 208 by suitable mechanical tensioning means, such as a spring (not shown).

Additionally, a mechanical releasing or de-tensioning means is provided to firstly remove tension from the reservoir 208 and then to apply a compressive force to bias the reservoir 208 into or toward the collapsed configuration. As will be explained, this forces air in the reservoir 208 to be expelled toward the main reservoir 4 is useful during a procedure of changing the main reservoir 4.

The assembly of connectors 10, 12, pipe 6, reservoir 208, tube 24 forms a colour change assembly of the second embodiment.

A capacitance air sensor 32 is arranged to monitor the contents of the reservoir 208 at a predetermined position therein to determine if it contains additive and/or air. If the capacitance air sensor 32 detects air an alarm is generated to alert the user.

The apparatus 400 is shown in FIG. 19 in an operating state with the main reservoir partially full of fluid and the intermediate reservoir 208 suspended and full of fluid and in a generally expanded configuration.

The apparatus 400 may be assembled and operated as follows:

A colour change assembly comprising an empty reservoir 208 is selected and suspended, for example from a support bar (not shown).

Reservoir 4 is full of additive which it is desired to deliver into a process. It is supported in position by means not shown and then pipe 6 is connected to its outlet via valve 10.

Due to a combination of the reservoir 208 expanding and static head pressure of the reservoir 4, the reservoir 208 begins to fill with additive. Also, the pump 26 is operated to charge intermediate reservoir 208 with additive which flows from reservoir 4 via the pipe 6 and into the reservoir 208. The suction of the pump assists in drawing additive into the reservoir 208.

The reservoir 208 expands until it is substantially full of fluid, as shown in FIG. 19. The pump 26 delivers additive from reservoir 208 via pipe 24 into a process.

As fluid is fed to pump 26, the amount of fluid in reservoir 208 falls and further fluid is drawn from the main reservoir 4 to replenish reservoir 208.

The capacitance air sensor 32 continuously monitors the capacitance of the contents of reservoir 208 to determine if the region opposite the sensor includes additive or air.

A viscosity range of the fluid is desired to be greater than water and more preferably in the range of 1000 to 30000 cp. The viscosity of the fluid dampens the action of the reservoir 208 moving between the extended and collapsed configurations. Thus it is possible for the operator to "feel" when air is being removed from the reservoir 208 by a reduction in damping of the reservoir 208 when refilling or evacuating the reservoir 208 of air, as will be explained.

As shown in FIG. 20, when it is detected that air has entered the reservoir 208 by the sensor 32 and cpu 34 an alarm or signal is generated to alert the operator. The main reservoir 4 is then replenished by replacement with a new full container and the connector 10 attached to the new reservoir 4. During this replenishment or reservoir replacement process the pump 26 continues to run feeding the process with fluid which advantageously reduces a process stoppage whilst the reservoir 4 is replaced.

Figure 21:
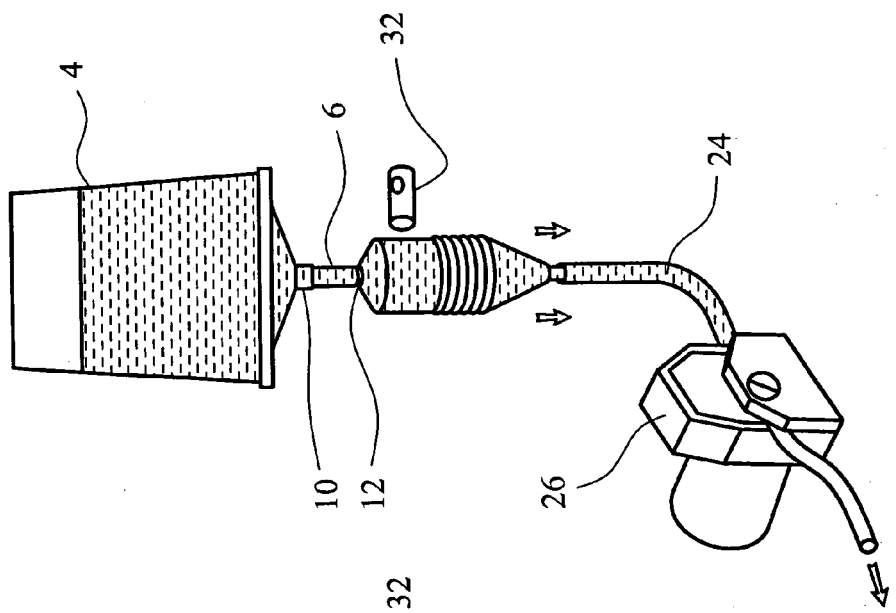
FIG. 21 is a view of the apparatus of FIG. 19 with a substantially full main reservoir and an intermediate reservoir containing gas.
Figure 22:
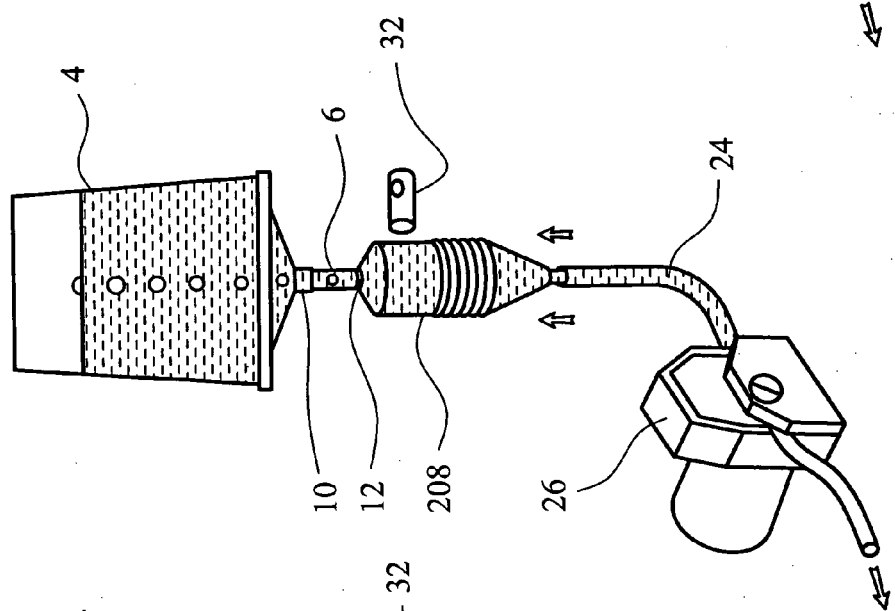
FIG. 22 is a view of the apparatus of FIG. 19 with a substantially full main reservoir and an intermediate reservoir being evacuated of gas.
Figure 23:
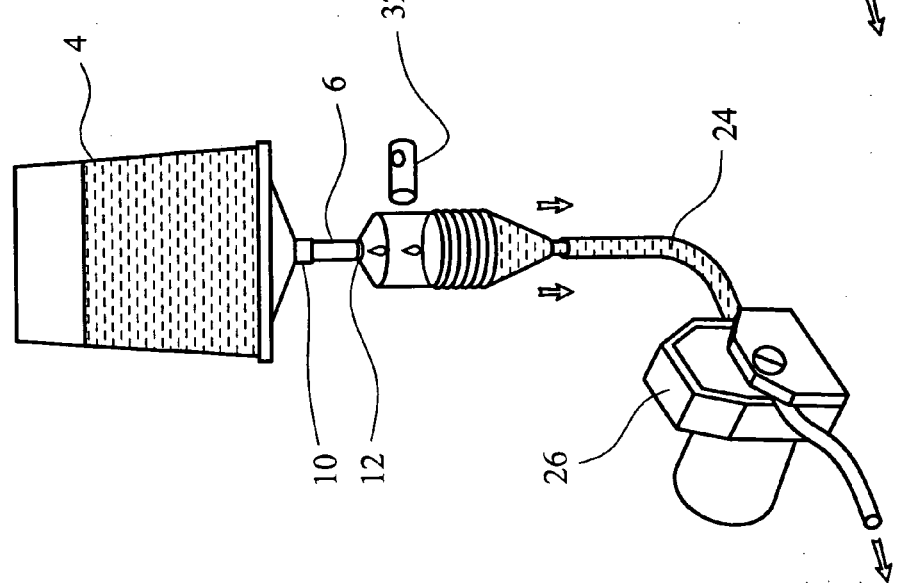
FIG. 23 is a view of the apparatus of FIG. 19 with a substantially full main reservoir and a full intermediate reservoir.

When the main reservoir 4 has been replaced, it is necessary to expel air from the reservoir 208 and pipe 6. To do this, the de-tensioning means is applied to the reservoir to bias the reservoir 208 in the collapsed position, as shown in FIG. 21. In one embodiment, the de-tensioning means is a lever mechanism operated by the user to collapse the reservoir 208. The reduction in volume of the reservoir 208 forces air upward through the pipe 6 into the main reservoir 4, through which it rises to the top. The reservoir 208 is then released to gradually extend and increase in volume, thus filling with fluid from the main reservoir 4, as shown in FIG. 22.

Figure 11:
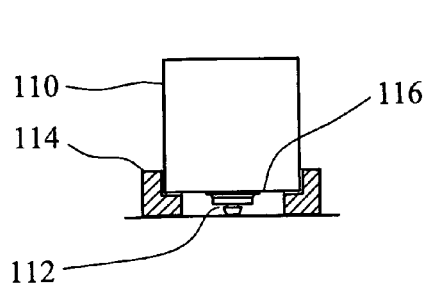
FIG. 11 is a cross-sectional view showing one form of main additive reservoir in position.
Figure 14:
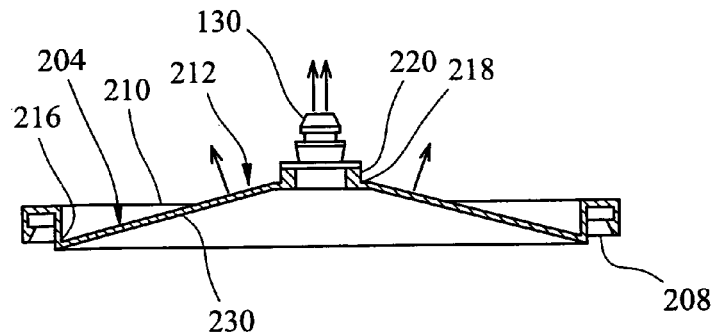
FIGS. 14 and 15 are cross-sections along line XVII-XVII of FIG. 13, with the lid in operative and storage positions respectively.
Figure 13:
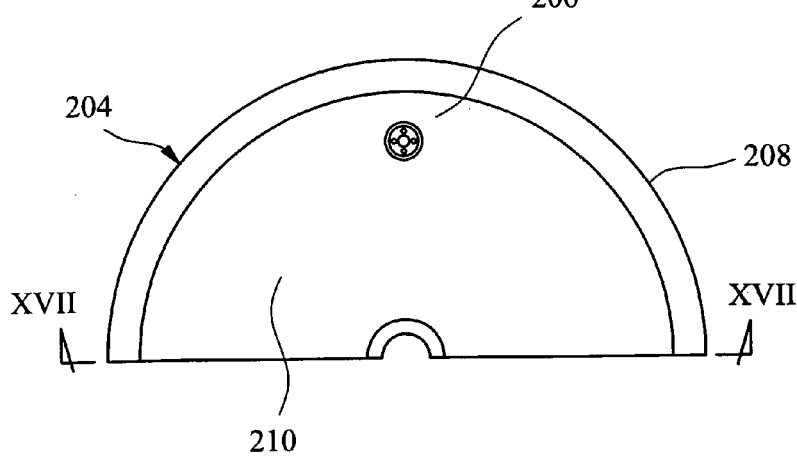
FIG. 13 is a plan view showing half of a lid.
Figure 15:
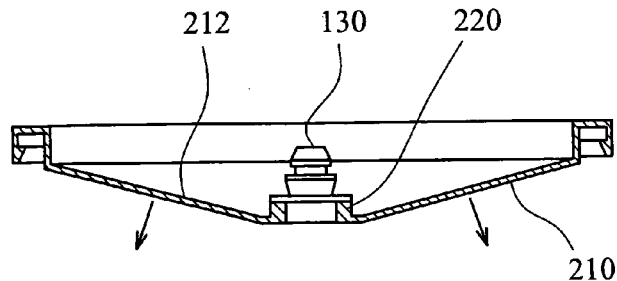

The main additive reservoir 4 may be of any convenient design. In one embodiment, it may comprise a known "bag-in-a-box" container 110, for example a POLITAINER (Trade Mark) as shown in FIG. 11. The container 110 is substantially cube-shaped and includes a valve 112 at its lower end which controls the flow of fluid from the plastics liner (not shown) within the box. In FIG. 11, the container 110 is shown seated in a housing 114 which may be defined on a trolley of a type shown in FIG. 4. The container 110 is a convenient shape for storage (the cube-shaped container can easily be stacked) but it can be difficult to extract all of its contents due to the planarity of internal wall 116 thereof. A container 200 which may overcome problems associated with the container 110 is shown in FIGS. 13 to 15.

The container 200 includes a pail 202 of a standard design. According it may be an off-the-shelf pail and, accordingly, may be relatively cheap. The pail 202 is releasably engageable with a lid 204. The lid include a one-way valve 206 which is arranged to allow air to replace fluid discharged from the pail 202 in use, but prevent loss of fluid through the valve.

The lid includes an outer lip 208 arranged to be engaged with the rim of the pail 202 in a conventional manner. Inwards of the lip 208, the lid includes an annular region 210 which is arranged to be moved from the FIG. 14 position wherein it defines a convex outer surface 212 to the FIG. 15 position wherein outwardly facing surface 212 is concave. The lid is made out of a plastics material by injection moulding. Annular regions 216 and 218 of the moulding are arranged to act as hinges or slightly weakened regions to enable the annular region 210 to move between the FIGS. 14 and 15 positions.

The lid includes a boss 220 in which is sealingly engaged one part of a dry disconnect valve 10 (e.g. connector 133 described hereinafter).

In use, pail 202 may be filled with a liquid in the normal manner. Then lid 204 can be secured to the pail in a conventional manner. Thereafter, the lid can be urged from the FIG. 14 to the FIG. 15 position by a person pushing the boss 220 downwardly. When arranged in the FIG. 15 position, the valve 130 is sufficiently recessed within the lid that it does not interfere with or restrict the stacking of a similar pail/lid combination on top of the lid 204 (attached to a pail). Thus, the pail/lid assembly can readily be transported or stored whilst taking up a minimum volume.

Figure 12:
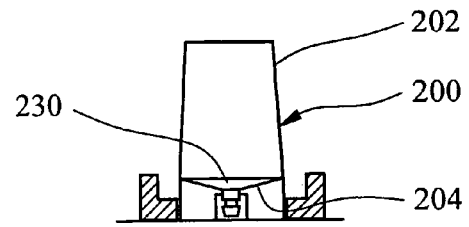
FIG. 12 is a cross-sectional view showing another form of additive reservoir.

When a container 200 with lid 202 is ready for use to deliver its liquid, its lid can be moved to the FIG. 15 position and the container/lid inverted as shown in FIG. 12. When in this position, recovery of liquid from the container 200 will be optimised due to the downwards tapering of internal surface 230.

The dry disconnect valve 10 associated with reservoir 4 may be of any convenient type. In one embodiment, the reservoir 4 may incorporate a male element of a type described in U.S. Pat. No. 5,911,403 or US2003/0196703A which is arranged to cooperate with a corresponding female element suitably also of the type described in the aforementioned documents. Male elements of the type described are cheap to manufacture and may therefore be disposed of with reservoir 4 when it is empty. However, the female elements described are more costly and are intended for re-use.

As described above, it may be desirable for a colour change assembly (FIG. 3) to be supplied to a customer including a sample of colour to allow the customer to test the colour and, additionally for a library of colour change assemblies to be stored after use ready for subsequent re-use. For this to be done cost-effectively, the connector carried by pipe 6 must be relatively cheap. To this end, a relatively cheap connector for cooperation with male connectors of the type described in U.S. Pat. No. 5,911,403 or US2003/0196793A may be provided as described with reference to FIGS. 16 to 18.

Figure 17:
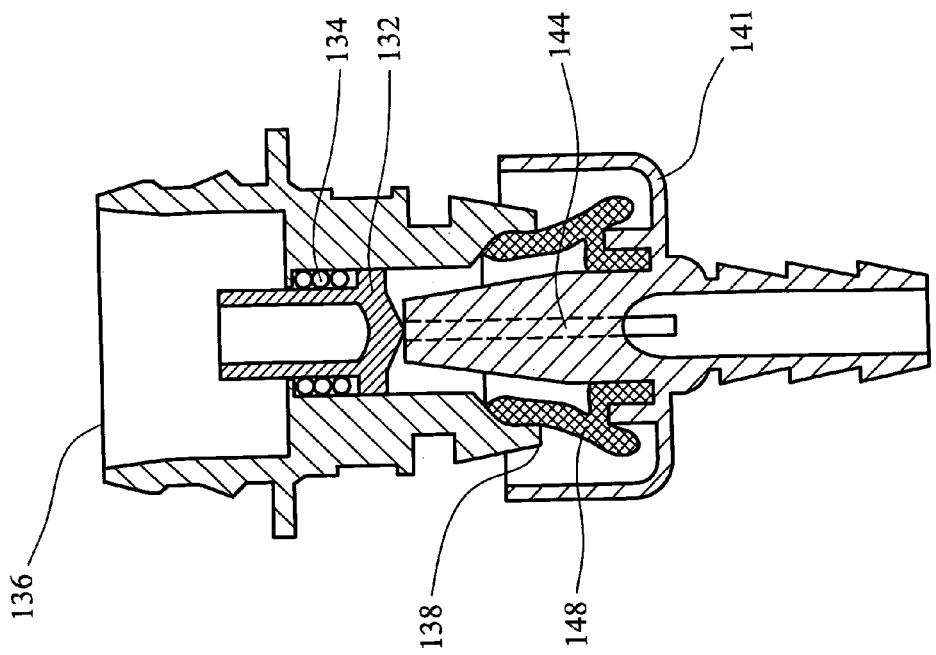
FIG. 17 is a view similar to that of FIG. 16, except the component parts are fully engaged.
Figure 16:
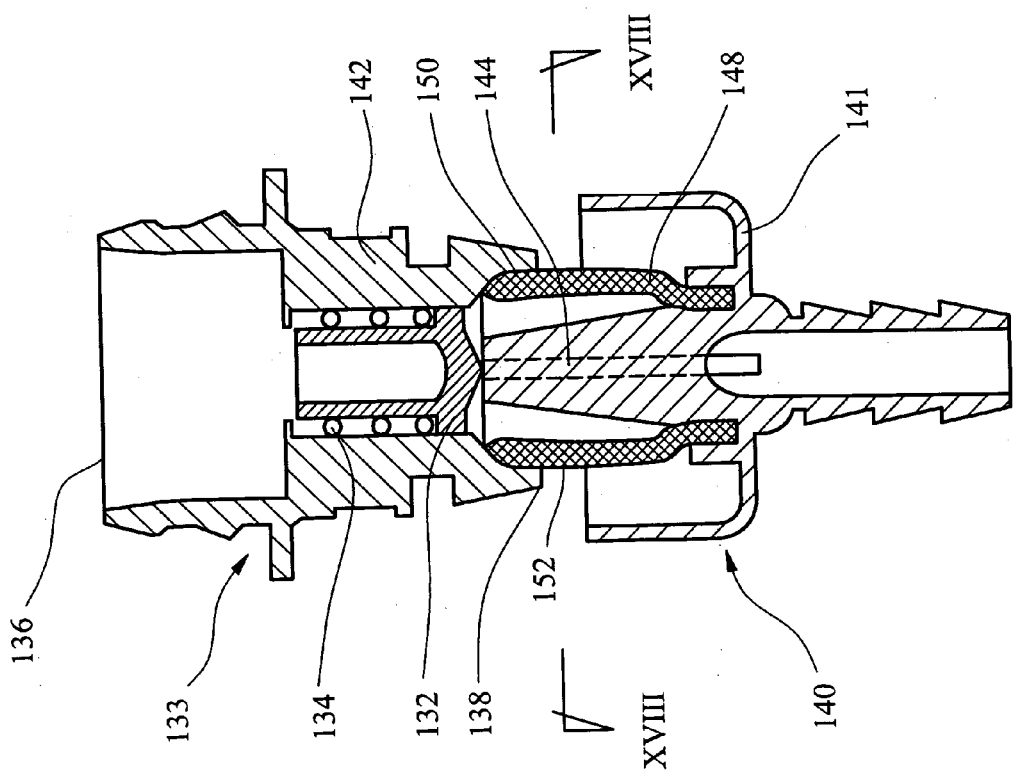
FIG. 16 is a cross-section through a connector during initial engagement of its component part.

Referring to FIGS. 16 to 18, there is shown a first connector part 133 which may be generally of the type shown in US2003/0196703A, for example as illustrated in FIGS. 4a and 14 thereof. The content of US2003/0196703A is incorporated herein insofar as it describes the connector part 133. The connector part 133 includes a poppet member 132 which is biased by spring 134 downwardly (in the sense of FIG. 16). The poppet member 132 is movable between the closed position of FIG. 16 and an open position in which it is raised upwardly relative to the FIG. 16 position and thereby defines a fluid passageway between ends 136, 138 of the connector part.

A connector part 140, shown in FIG. 16, comprises a rigid housing 141 which is arranged to be releasably engaged with housing 142 of the connector part 133 (although the detail in this regard has been omitted from FIGS. 16 and 17). Within the housing 141 is a rigid activation projection 144 which is cruciform in cross-section, with the cross-section becoming narrower on moving upwardly (in the sense of FIG. 16). Between the housing 141 and the projection 144 is an annular bellows seal 148 which is elastomeric and is therefore compressible.

The connector part 140 may be coupled to connector part 133 by initially engaging outer edge 150 of the bellows seal 148 with stepped region 152 of connector part 133, thereby to effect a substantially fluid tight seal between the seal 148 and connector part 133. When initially in position, projection 144 contacts poppet 132. The connector parts 133 and 140 may be urged closer together as illustrated in FIG. 20 whereby projection 144 urges poppet 132 against spring 134 thereby to open a fluid passageway between ends 136, 138 of the connector 133, and bellows seals 148 is compressed in the direction of insertion of the connector part 140 into connector part 133 so that the seal continues to sealingly engage stepped region 152 whilst being accommodated in the area between housing 141 and projection 144. When arranged as described housing 141 may be releasably secured to housing 142 for example by a bayonet or screw-threaded arrangement or the like.

Whilst connector part 133 is valved by means of the spring loaded poppet 132, the connector part 140 does not include any valve and apart from the bellows seal does not include any moving parts.

It will be appreciated that engagement of connector 133 and 140 may be accomplished substantially without any leakage due to the fact that the connectors are sealed together via bellows seal 148 before poppet 132 is caused to move to open the fluid passageway in connector part 133.

Disconnection of connector 133 and 140 may be accomplished by following the above described steps in reverse. Whilst connector 140 may not itself include any valve substantially dry disconnection of connector parts 133 and 140 may be achieved by using peristaltic pump 14 (FIG. 1) to withdraw fluid from the connector part 140 and its attached pipe 6, into reservoir 8 so that when connector parts 133 and 140 are disconnected there is substantially no fluid in connector 140 which may drip therefrom.

It will be appreciated that connector 140 will be cheap to manufacture and may therefore be disposable as may be required, particularly in comparison to the more complex arrangement of U.S. Pat. No. 5,911,403.

The invention claimed is:

1. Apparatus for delivering a fluid to a location, the apparatus comprising:
   a fluid supply means for supplying fluid,
   wherein the fluid supply means for supplying fluid is in fluid communication with a reservoir having a variable volume,
   wherein said reservoir includes a fluid inlet and a fluid outlet via which fluid may be delivered to the location,
   wherein said fluid outlet communicates with a dosing means for dosing which is arranged to deliver a predetermined amount of fluid to said location, and
   wherein said dosing means for dosing communicates with a positive displacement pump.

2. A method of delivering a fluid to a location wherein said fluid is a liquid colourant and is supplied into a plastics material, the method using the apparatus according to claim 1 and comprising:
   (i) delivering fluid from a fluid supply means to a reservoir which has a variable volume; and
   (ii) delivering fluid from the reservoir to the location.

3. Apparatus according to claim 1, wherein said reservoir is collapsible.

4. Apparatus according to claim 1, said apparatus being arranged to deliver fluid to a premixer stage of plastics forming equipment.

5. Apparatus according to claim 1, wherein said apparatus includes a fluid conduit for passage of fluid from the fluid supply means for supplying fluid to the reservoir via a fluid inlet wherein said conduit is connected to the reservoir by a means for connecting which is not a valved connection.

6. Apparatus according to claim 1, wherein said fluid supply means for supplying fluid comprises a receptacle having an outlet means, the outlet means including an opening for passage of fluid and a region surrounding the opening, wherein said region is movable from a first storage position to a second operative position in which it tapers towards said outlet.

7. Apparatus according to claim 1, the apparatus including non-invasive monitoring means for monitoring the contents of the reservoir, said monitoring means being arranged to monitor the reservoir to give an indication of at least one of whether it contains a gas and whether the amount of gas in the reservoir is above a predetermined level.

8. Apparatus according to claim 7, wherein said monitoring means monitors the reservoir at a position which is closer to the inlet than to the outlet of the reservoir.

9. Apparatus according to claim 1, which includes a control means which is arranged to communicate with a dosing means for dosing and with a monitoring means for monitoring the contents of the reservoir and wherein said control means is arranged to operate a signal means for signalling to an operator when the fluid supply means for supplying fluid needs to be replaced.

10. Apparatus for delivering a fluid to a location, the apparatus comprising:
a fluid supply means for supplying fluid,
wherein the fluid supply means for supplying fluid is in fluid communication with a reservoir having a variable volume, and wherein the reservoir includes an outlet via which fluid may be delivered to the location,
wherein said apparatus includes a fluid conduit for passage of fluid from the fluid supply means for supplying fluid to the reservoir via a fluid inlet wherein said conduit is connected to the reservoir by a connection means for connecting which is not a valved connection.

11. Apparatus according to claim 10, wherein said fluid conduit is releasably connected to the fluid supply means for supplying fluid.

12. Apparatus according to claim 10, wherein said fluid supply means for supplying fluid includes a valve member arranged to cooperate with a valve member associated with said fluid conduit, whereby the two valve members define a valve means associated with a connection between the conduit and fluid supply means for supplying fluid, wherein said fluid supply means for supplying fluid incorporates a valve having an opening in which is arranged an operating member for controlling the flow of fluid through the valve; and said fluid conduit incorporates a connector for connection to the valve, wherein said connector comprises sealing means for sealing arranged to sealingly engage the valve and actuation means for contacting said operating member of the valve for opening/closing it, wherein the connector is arranged to be releasably connected to the valve so that the sealing means for sealing sealingly engages the valve prior to the actuation means co-operating with the operating member to allow the flow of fluid between the valve and the connector.

13. Apparatus according to claim 10, wherein said reservoir is collapsible.

14. Apparatus according to claim 10, wherein said reservoir includes a fluid inlet and the fluid outlet, and wherein said fluid outlet communicates with a dosing means which is arranged to deliver predetermined amounts of fluid to said location.

15. Apparatus according to claim 10, said apparatus being arranged to deliver fluid to a premixer stage of plastics forming equipment.

16. Apparatus according to claim 10, wherein said fluid supply means comprises a receptacle having an outlet means, the outlet means including an opening for passage of fluid and a region surrounding the opening, wherein said region is movable from a first storage position to a second operative position in which it tapers towards said outlet.

17. Apparatus according to claim 10, the apparatus including non-invasive monitoring means for monitoring the contents of the reservoir, said monitoring means being arranged to monitor the reservoir to give an indication of at least one of whether it contains a gas and whether the amount of gas in the reservoir is above a predetermined level.

18. Apparatus according to claim 17, wherein said monitoring means monitors the reservoir at a position which is closer to the inlet than to the outlet of the reservoir.

19. Apparatus according to claim 10, which includes a control means which is arranged to communicate with a dosing means for dosing and with a monitoring means for monitoring the contents of the reservoir and wherein said control means is arranged to operate a signal means for signalling to an operator when the fluid supply means needs to be replaced.

20. Apparatus for delivering a fluid to a location, the apparatus comprising:
a fluid supply means for supplying fluid,
wherein the fluid supply means for supplying fluid is in fluid communication with a reservoir having a variable volume,
wherein the reservoir includes an outlet via which fluid may be delivered to the location,
wherein said fluid supply means for supplying fluid comprises a receptacle having a receptacle outlet,
wherein the receptacle outlet includes an opening for passage of fluid and a region surrounding the opening, and
wherein said region is movable from a first storage position to a second operative position in which it tapers towards said receptacle outlet.

21. Apparatus according to claim 20, wherein said reservoir is collapsible.

22. Apparatus according to claim 20, wherein said reservoir includes a fluid inlet and a fluid outlet, wherein said fluid outlet communicates with a dosing means which is arranged to deliver predetermined amounts of fluid to said location.

23. Apparatus according to claim 20, said apparatus being arranged to deliver fluid to a premixer stage of plastics forming equipment.

24. Apparatus according to claim 20, the apparatus including non-invasive monitoring means for monitoring the contents of the reservoir, said monitoring means being arranged to monitor the reservoir to give an indication of at least one of whether it contains a gas and whether the amount of gas in the reservoir is above a predetermined level.

25. Apparatus according to claim 20, which includes a control means which is arranged to communicate with a dosing means for dosing and with a monitoring means for monitoring the contents of the reservoir and wherein said control means is arranged to operate a signal means for signalling to an operator when the fluid supply means for supplying fluid needs to be replaced.

* * * * *